United States Patent
Kasahara (10) Patent No.: US 7,766,221 B2
(45) Date of Patent: Aug. 3, 2010

(54) IMAGE DISPLAY APPARATUS AND PROGRAM THEREFOR

(75) Inventor: Noboru Kasahara, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 0 days.

(21) Appl. No.: 12/373,326

(22) PCT Filed: Jul. 4, 2007

(86) PCT No.: PCT/JP2007/063341

§ 371 (c)(1),
(2), (4) Date: Jan. 12, 2009

(87) PCT Pub. No.: WO2008/007588

PCT Pub. Date: Jan. 17, 2008

(65) Prior Publication Data

US 2009/0200366 A1    Aug. 13, 2009

(30) Foreign Application Priority Data

Jul. 12, 2006   (JP) .............................. 2006-192134

(51) Int. Cl.
*G06F 17/00* (2006.01)
*A63F 9/24* (2006.01)
(52) U.S. Cl. .............................. 235/375; 463/42; 463/43
(58) Field of Classification Search .............. 463/1–47
See application file for complete search history.

(56) References Cited

U.S. PATENT DOCUMENTS

2002/0082087 A1   6/2002   Kuroda

2002/0138364 A1   9/2002   Katagiri et al.
2003/0050839 A1   3/2003   Shiomi

FOREIGN PATENT DOCUMENTS

| CA | 2 078 176 | 8/1997 |
|---|---|---|
| JP | 11-347246 | 12/1999 |
| JP | 2000-140412 | 5/2000 |
| JP | 2001-014021 | 1/2001 |
| JP | 2002-108989 | 4/2002 |
| JP | 2002-189938 | 7/2002 |
| JP | 2002-351934 | 12/2002 |
| JP | 2003-076456 | 3/2003 |
| JP | 2003-157337 | 5/2003 |
| JP | 2003-216847 | 7/2003 |
| JP | 2005-000338 | 1/2005 |
| JP | 2005-168946 | 6/2005 |

*Primary Examiner*—Michael G Lee
*Assistant Examiner*—Laura Gudorf
(74) *Attorney, Agent, or Firm*—Rankin, Hill & Clark LLP (57) ABSTRACT

An image display apparatus increases user's buying intention by creating a highly original image character and providing users with product information they do not obtain yet. Identification information determination means determines identification information attached to a product and displays an image corresponding to the product on a display apparatus. Combinable component search means retrieves image data of one or more components that constitute another product identified with another identification information and that can be combined with the plurality of components that constitute the product corresponding to the determined identification information. The product image and an image selected from among the retrieved images are combined to make a new image. Application execution means executes an application with the created image as an image character if a plurality of components that constitute the image displayed on a screen can be all identified with the identification information determined in advance.

13 Claims, 8 Drawing Sheets

IMAGE DISPLAY APPARATUS AND PROGRAM THEREFOR

TECHNICAL FIELD

The present invention relates to an image display apparatus and a program for image display, which enables an application to use an image of a product displayed on a screen by inputting identification information upon executing the application.

BACKGROUND ART

Japanese Patent Application Publication No. 2003-76456 (JP2003-76456A: Patent Document 1) discloses a sales promotion system in which an image relevant to or associated with a product is displayed on a screen of a display apparatus by inputting and registering identification information attached to the product or the like that has been purchased. This apparatus can display the image either statically or dynamically.

Japanese Patent Application Publication No. 2003-157337 (JP2003-157337A: Patent Document 2) discloses a product management system in which a product image having the same configuration of a purchased product is displayed on a screen of a display apparatus by inputting identification information, which is constituted from identification information containing specific information about the product and encoded management information. The document also describes about a game in which the displayed product image is used as its image character so that users can enjoy the game with the image character living within a set-up environment, by setting up a living environment corresponding to the image characters in a computer.

Japanese Patent Application Publication No. 2005-338 (JP2005-338A: Patent Document 3) discloses a method of performing an automobile game in which, when a user inputs information for specifying a specification of an automobile, recommendable setting data about customizable articles is extracted based on the inputted information so that a virtual automobile is created with the extracted setting data.

[Patent Document 1]
JP2003-76456A
[Patent Document 2]
JP2003-157337A
[Patent Document 3]
JP2005-338A

DISCLOSURE OF THE INVENTION

Problems to be Solved by the Invention

However, in such conventional image display apparatus of Patent Documents 1 and 2, the image obtained and displayed by inputting identification information is an image of the purchased product, or an image relevant to the product. In addition, even though components that constitute a real product are partially detachable or replaceable with other components, it is impossible for the image obtained by inputting identification information into the conventional image display apparatus to detach a part of components that constitute the image or partially replace them with other component images. Therefore, users can hardly have a fun of recombining components that constitute the product unless they actually purchase the product.

Conventionally, when using a displayed image as an image character used in an application such as a game, for example, what is available is just to use the image obtained by inputting identification information as it is. Accordingly, users cannot use an image that they originally-recombined as the image character for the application such as a game. It is impossible to execute the applications using the originally-recombined image character.

In the automobile game of Patent Document 3, though the virtual automobile can be created by selecting from among the recommendable setting data about customizable articles, the selection is available only within the predetermined range of customizable articles. As a result, just an expected and unsurprising virtual automobile is obtainable in this automobile game, and it is difficult to meet the demand of users for creating an unexpected automobile.

Since the automobile game of Patent Document 3 has nothing to do with a real automobile product for sale, it cannot be used in sales promotion of real products.

An object of the present invention is to provide an image display apparatus and a program for image display which enable a user to create a highly original image character even if the user does not obtain identification information through purchase of a product, can give the user information on the product and can increase the user's buying intention.

Another object of the present invention is to provide an image display apparatus and a program for image display which do not allow the user to use an originally-created image character in an application unless the user actually purchases a real product and inputs its identification information, can give the user information on the product and can increase the user's buying intention.

A further object of the present invention is to provide an image display apparatus and a program for image display which allow a user to combine image data of a plurality of components on a screen only under the same condition as that for combining the real components.

A still further object of the present invention is to provide an image display apparatus and a program for image display which is capable of helping an unimaginative user create a highly original image character.

Means of Solving the Problem

The present invention improves an image display apparatus that includes identification information determination means, product image data storage means, image display control means, and application execution means, to allow a user to create an original image character and increase the user's buying intention. The identification information determination means determines identification information acquired from a product, which is constituted from a combination of a plurality of changeable components and which has the identification information. Examples of such product constituted from the combination of a plurality of changeable components include assembly toys such as a robot and a figure. The identification information provided for a product may be directly attached to the product, or may be attached to a description or a package or the product. How to indicate the identification information with respect to the product is arbitrary. The identification information may comprise a serial number, a bar code, or any other ways. It is preferred that different identification information is attached to each product one to one. In this manner, even when a person tries to use the identification information which is attached to a product that other person has purchased and which has been already registered or used, the identification information is unavailable for the person. Accordingly, those who want to use the application will purchase the product to get an available identification information.

The product image data storage means stores image data relating to images of the product having the identification information. The image data includes image data relating to the images corresponding to the plurality of components that constitute the product. Image display control means reads the image data of the image corresponding to the product from the product image data storage means, based on the identification information determined by the identification information determination means, and controls displaying of the image of the product statically or dynamically on a screen of the image display apparatus.

The application execution means executes an application such as a game, using the image of the product as an image character. The image character, which may be either a static image character or a dynamic image character, means what is display-controllable by the application upon executing the application. The application is not limited to the application of a game program and may include various kinds of programs in which image characters are used, such as a program for intellectual training.

In particular, the present invention further includes the combinable component search means. The combinable component search means retrieves image data of one or more components that constitute another product identified by another identification information and that can be combined with the plurality of components that constitute the product corresponding to the identification information determined by the identification information determination means. Search results are displayed on the screen via the image display control means. For example, when the product having the identification information identified by the identification information determination means is a fighter's figure holding a weapon, the above-mentioned "another product" identified by another identification information represents a product such as another weapon the fighter can hold and a vehicle the fighter can ride. The combinable component search means retrieves images of the components included in the product which can be combined with the fighter holding a weapon (for example, images of wearable components, such as a shield, armor, helmet, shoes, glove or the like, or components of vehicle, such as a handle, fuel tank, a tire or the like). The search results are then displayed on the screen by the image display control means.

The image display control means of the present invention has a function of selectably displaying the search result obtained by the combinable component search means on the screen, and a function of displaying an arbitrary combination of one or more optionally selected images from among the images of the one or more components that have been retrieved by the combinable component search means and displayed on the screen, with the image of the product. Here, the combination includes either of the cases where an additional component is added to the core product, or where another component is replaced with an existing component. The image display control means can of course display an image in which some component thereof is excluded. With such function, the image display control means can display, for example, an image of a shield attached to the fighter holding a weapon, an image where a handle of a vehicle is attached to a fighter's arm, an image where a tire is attached to a fighter's foot, or an image where a weapon is attached to a fighter in replacement of an arm of the fighter. In the present invention, the application execution means is configured to execute the application using the image displayed on the screen by the image display control means as the image character, only when the plurality of components that constitute the image displayed on the screen by the image display control means can be all identified with the identification information determined by the identification information determination means. With such configuration, the invention does not allow the user to use a highly original image which has been created by combining various kinds of the images of components in the application, unless the user actually purchase a real product corresponding to the image so as to make all the images of components that constitute the highly original image into identifiable state with the identification information attached to the products. Accordingly, in order to use the originally created image as it is in the application as the image character, the users must input the identification information of the components used in the originally-created image. Namely, if the user wants to use an image in which a tire is attached to the fighter's foot in the application as the image character, it is necessary for the user to purchase a product of a vehicle containing the tire and make the identification information thereof identified by the identification information determination means. The invention may increase buying intention of the user who wants to use the originally-created images in the application.

If the images of the plurality of components that constitute the image character displayed on the screen by the image display control means include an image of a component that cannot be identified with the identification information determined by the identification information determination means, the application execution means may display the image character in an arbitrary expression. If the application cannot be executed at all when there is an image of the component that cannot be identified in the image character, all the efforts of the user creating an originally combined image come to nothing. In such a case, the application may be executed by using as the image character an image which is made by excluding the image of the component that cannot be identified from the image displayed on the screen by the image display control means. With such execution, even when the image of a component that cannot be identified with the identification information is included in the images displayed on the screen by the image display control means, the application may be executed by using a part of the image constituted from a combination of images of components as the image character. Application may also be executed by using, as an image character, an image in which the image of the component that cannot be identified is indicated as a virtual component (indicated with a broken line or imaginary line). With such execution, users can recognize that the components that constitute the image character include the component that cannot be identified.

It is preferred that the plurality of changeable components are so constructed to be combinable only if a predetermined combination condition is satisfied, and that the predetermined combination condition is added to the image data of the plurality of components corresponding to the plurality of components of which the image data are stored in the product image data storage means. If the product is a robot toy, for example, a predetermined connection structure is used as the connection structure (or joint structure) which connects the components constituting the robot toy. The predetermined combination condition may be defined so that components without the predetermined connection structure cannot be connected. If the same combination condition is added both to the image data relating to the plurality of components and to the real components, connection is allowed only between the images of components corresponding to components having the same connection structure. As a result, whether or not an image of a component is combinable upon creating an original image is consistent with whether or not a real component corresponding to the image of the component is combinable or not. Accordingly, customers can confirm before purchase that if an image of a component is combinable upon creating an image, a real component corresponding thereto is also combinable and can get information about the products before purchase.

The image of the product displayed by the image display control means and images of components retrieved by the combinable component search means may be shown on screens separately. But it is preferable that both the image of the product and the images of components are shown on the same screen side by side. In this manner, users can excite their imagination for selecting combinable components upon looking at the images of the product and the components. In addition, since a combined state can be confirmed immediately, users can experience pleasure of image creation by combining components without an onerous operation of switching screens.

The image display apparatus may further comprise combination pattern determination means which displays on the screen a plurality of combination patterns, based on a concept that a user prefers. The combination pattern determination means automatically selects a component that can be combined with the image displayed by the image display control means from among the plurality of components retrieved by the combinable component search means, and then determines a plurality of combination patterns. With such configuration, a plurality of images of combined components in which the user's concept has been reflected are automatically displayed. As a result, a useful reference sample can be shown to users who can hardly imagine how to combine the components.

A program for image display of the present invention, which is installed in a computer, is configured to implement in the computer: the identification information determination means, the product image data storage means, the image display control means, the application execution means, and the combinable component search means.

BEST MODE FOR CARRYING OUT THE INVENTION

Figure 1:
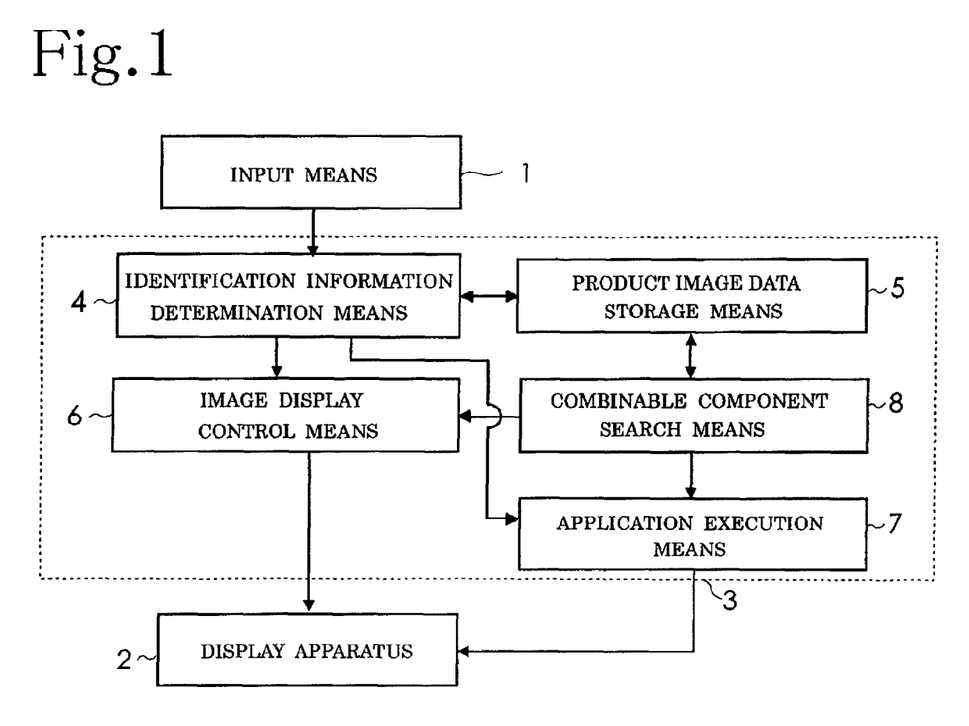
FIG. 1 is a block diagram showing a configuration of an image display apparatus of an embodiment of the present invention.
Figure 2:
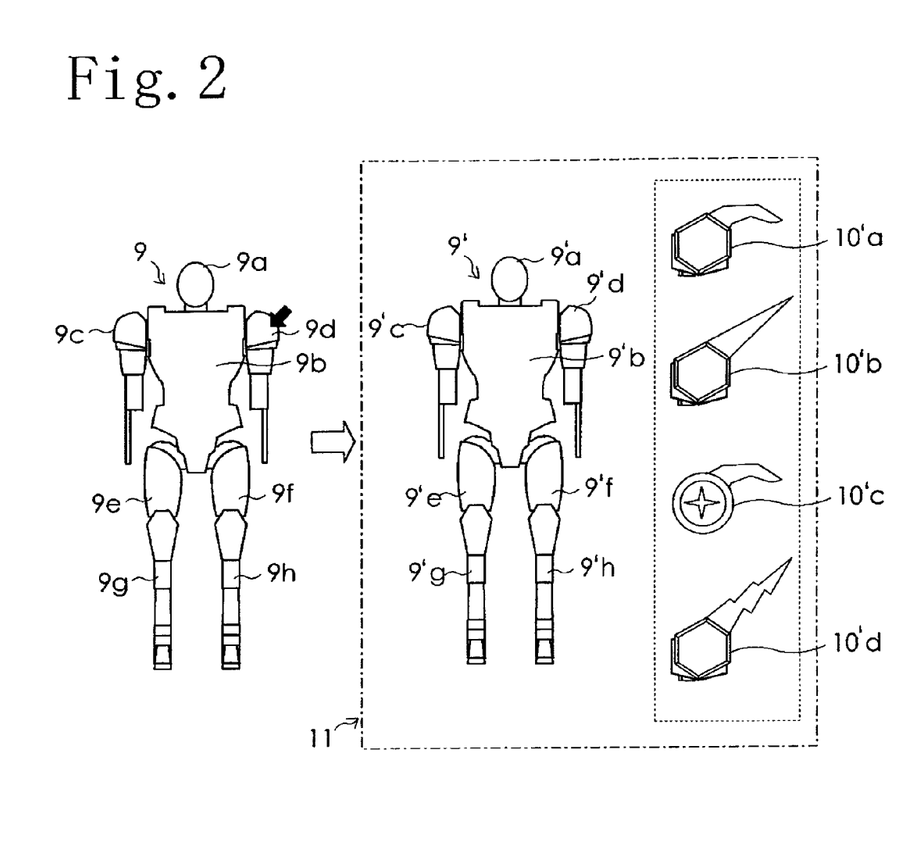
FIG. 2 shows a product that can be identified with an identification mark and an image thereof, and an example of images of changeable components.
Figure 3:
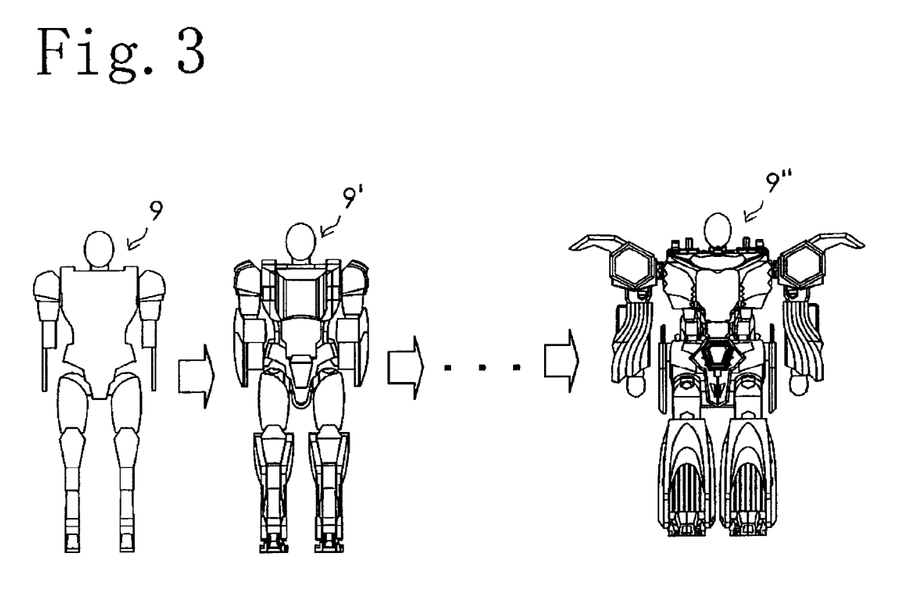
FIG. 3 shows images in the course of combining various images.

Embodiments of the present invention will now be described in detail hereinbelow with reference to the accompanying drawings. FIG. 1 is a block diagram showing a configuration of an image display apparatus of the present invention. FIG. 2 shows a product that can be identified with an identification mark and an image thereof, and an example of images of changeable components. FIG. 3 shows images in the course of combining various images. The present embodiment is realized in a personal computer by installing the program for image display apparatus of the present invention in the personal computer. Input means 1 may comprise a keyboard, a mouse or the like. Display apparatus 2 may comprise a display of a personal computer. An image display apparatus 3 has identification information determination means 4, product image data storage means 5, image display control means 6, application execution means 7, and combinable component search means 8 so that original image characters can be created and user's buying intention can be increased. The present invention is based on the premise that there is a product constituted from a combination of a plurality of changeable components, and that the product has identification information. Typical examples of such product constituted from a combination of a plurality of changeable components include assembly toys, such as robots and figures. The identification information of the product may be given directly by printing or stamping an identification number etc. on the product, or sticking a sticker with the identification number on the product. However, as a matter of course, the identification information may be attached to a description or a package, etc. of the product. How to indicate the identification information is optionally selected from among various ways of indication such as a number, bar code or electronic information stored in an IC tag. In the present embodiment, a different identification information is given to each product one to one. As a result, once an owner of the product has used (registered) the identification information attached to the product, it is impossible for any other person to use the already-registered identification information even if he (she) wants to.

The identification information determination means 4 determines the identification information attached to the product. If the identification information is constituted from a combination of numbers and characters, they are sequentially inputted through input means 1 such as a keyboard etc. If the identification information is constituted from a bar code or the like, the input means 1 may be provided with a bar code reader. If the identification information is stored in an IC tag, the input means 1 may be provided with an IC tag reader.

Product image data storage means 5 stores image data relating to images of the product having the identification information. Here, the image data includes image data relating to images corresponding to the plurality of components that constitute the product. For example, assuming that the product 9 is a doll figure as shown in the left-hand side of FIG. 2. The product (doll figure) 9 is constituted from a head 9a, a body 9b, arms 9c and 9d, thighs 9e and 9f, and shin sections with foot 9g and 9h. The image data of each component (9a to 9h) is stored in the product image data storage means 5 with an identification reference, which is used when one identification information attached to the product 9 is stored. The product image data storage means 5 also stores the image data of a plurality of components that constitute other two or more kinds of products with the identification reference, which is used when the identification information given to the respective products is stored. FIG. 2 further shows in its right-hand side a display screen 11 displaying an image 9' of the product 9 (doll figure) and images of exterior components product (images of exterior components) 10'a to 10'd which can be mounted to the product 9. The plurality of exterior components also have an identification information given thereto. Here, the image data of these exterior components is also stored in the product image data storage means 5 with the identification reference, which is used when the identification information is stored. The image data stored in the product image data storage means 5 may be either data of a static image or data of a dynamic image.

Image display control means 6 reads out image data of the image corresponding to the product from the product image data storage means 5, based on the identification information determined by the identification information determination means 4, and displays the image 9' of the product on a screen of the image display apparatus 2. The image display control means 6 has a function of selectably displaying a search result (that is, images of the exterior components product 10'a to 10'd) obtained by the combinable component search means 8 on the screen of the display apparatus 2. The image display control means 6 further has a function of displaying an arbitrary combination of one or more optionally selected images from among the images of the one or more components (images of the exterior components product 10'a to 10'd) that have been retrieved by the combinable component search means 8 and displayed on the screen, with the image of the product 9'.

The application execution means 7 executes an application such as a game by using the image of the product as an image character. In the example of FIG. 2, the image 9' of a doll figure (product) 9 is used as the image character, as will be explained later.

The combinable component search means 8, as described using the example of FIG. 2, retrieves image data of one or more components that constitute another product identified with another identification information and that can be combined with the plurality of components included in the image data relating to the image 9' of the product that corresponds to the identification information determined by the identification information determination means 4 (that is, the image data of the images 10'a to 10's representing the exterior components product) In the example of FIG. 2, the image of exterior component, which can be mounted to the left shoulder of the doll FIG. 9 (that is, components corresponding to the images 10'a to 10'd of the exterior components product), represent image of above-mentioned "another product identified with another identification information". If the doll FIG. 9 is a figure of fighter, products such as a weapon held by the fighter, a vehicle the fighter can ride, etc. may also become candidates for "another product identified with another identification information".

The above-mentioned image display control means 6 has a function of displaying a combination of an image selected from among the images of the one or more components 10'a to 10'd that have been retrieved by the combinable component search means 8, with the image 9' of the doll FIG. 9 displayed on the screen, as shown in FIG. 3. This function makes it possible to display on the screen an image 9'' of the doll FIG. 9 putting on the exterior components for example, whenever one of the exterior components is combined with the image 9'' of the doll FIG. 9 by a user operating the input means 1.

The application execution means 7 executes the application by using, as the image character, the image displayed on the screen by the image display control means 6, only when the plurality of components that constitute the image displayed on the screen of the display apparatus 2 by the image display control means 6 can be all identified with the identification information determined by the identification information determination means 4. The application execution means 7 of the present embodiment contains means for controlling a display operation of the display apparatus 2. For example, it should be assumed that the image shown on the rightmost side of FIG. 3 is the image finally displayed on the screen of the display apparatus 2 by the image display control means 6. If the plurality of components included in the image (image 9'' of the doll figure putting on the exterior components), which is shown on the rightmost side of FIG. 3 are all identified with the identification information determined by the identification information determination means 4, the image 9'' can be used in the application as the image character thereof.

If there is included an image of component which cannot be identified with the identification information determined by the identification information determination means 4 in the image of the plurality of components that constitutes the image displayed on the screen of the display apparatus 2 by the image display apparatus 3, the application execution means may display the image character in an arbitrary expression. Namely, if the application cannot be executed at all whenever there is any image of components which cannot be identified, all the efforts of the user creating a combined image come to nothing. In such a case, the application may be executed by using, as the image character, an image in which the image of component which cannot be identified is excluded from the images displayed on the screen by the image display control means 6, for example. Namely, assume that the image constituted from a combination of images of components that can be identified with the identification information determined by the identification information determination means 4 is the second image from the left of FIG. 3. In this case, application execution means 7 executes the application by using, as the image character, the image shown on the second from the left of FIG. 3 instead of the image shown on the rightmost side of FIG. 3. Application may be executed by using, as an image character, an image in which the image of the component that cannot be identified is indicated as a virtual component (by indicating with a broken line or imaginary line). In this manner, users can recognize that the components that constitute the image include a component that cannot be identified (component of which product has not been purchased yet).

With such application execution means 7 configured as mentioned above, even when the originally-created image has been created by combining various images of components, it is difficult to use the original image as it is in the application unless users have actually purchased real products corresponding to all the images of components constituting the originally-created image and the image has been identifiable by the identification information. Accordingly, in order to use as the image character, an original image created by the user as it is in the application, it is inevitable to input the identification information of the components currently used in the original image. This can induce an incentive of users, who want to use their originally-created images in the application, to purchase a product, and further, can provide users with the product information on combinable components.

In the present embodiment, the plurality of changeable components are configured to be combinable only when a predetermined combination condition is satisfied, and the predetermined combination condition is added to the image data of a plurality of components corresponding to the plurality of components stored in the product image data storage means 5. For example, if the product is a doll FIG. 9 of FIG. 2, a predetermined connection structure is used as a connection structure (or joint structure) which connects the components that constitute the doll FIG. 9. Similarly, the predetermined connection structure is used as a connection structure for connecting the exterior components to the doll FIG. 9 (components corresponding to the images of exterior components 10'a, etc.). Then, it is added to the image data relating to the components corresponding to those components, as the combination condition, that connection is not realized without the above-mentioned predetermined connection structure. Accordingly, images of the components can be combined on the screen only when the above-mentioned combination condition is satisfied. For more concrete explanation using the example of FIG. 2, one or more specific depressed portions which are not illustrated are formed on the surface of each component that constitutes the doll FIG. 9, which is a real product. On the other hand, specific protrusions that can be fitted with the specific depressed portions are formed on the real exterior components that correspond to the images of exterior components 10'a to 10'd. Accordingly, data about the specific depressed portions is added to the image data relating to the respective components 9'a to 9'h that constitute the doll FIG. 9. Similarly, data about the specific protrusions that can be fitted only with the specific depressed portions is added to the image data relating to the exterior components 10'a to 10'd. As a result, the combinable component search means 8 retrieves only images of other components which have a connection structure combinable to the components of the doll FIG. 9, in connection with the images of the components 9'a to 9'h, based on the added data about the connection structure of depressed portion and protrusion.

As mentioned above, if the same combination condition is added both to the real components and to the image data relating to the components, connection is allowed only between the images of components having a same type of connection structure. As a result, combination patterns of images relating to components, upon creating an original image, are identical with combination patterns of real components. Accordingly, it becomes possible to confirm before purchase that if an image of a component is combinable upon creating an original image, a real component corresponding thereto is also combinable so that customers can get information about products before purchase.

The initially-displayed image of the product and images of components retrieved by the combinable component search means 8 may be shown separately, but it may also be shown on the same screen side by side.

Figure 4:
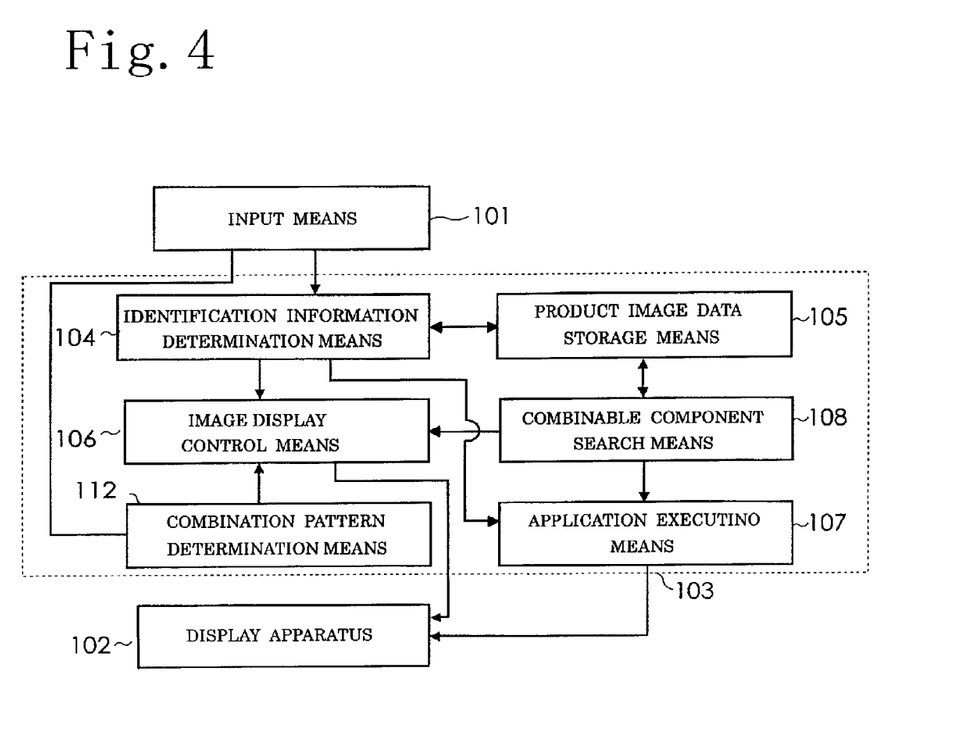
FIG. 4 is a block diagram showing a configuration of an image display apparatus of another embodiment of the present invention.

Next, another embodiment of the present invention will be described hereinbelow. FIG. 4 is a block diagram showing a configuration of the image display apparatus of another embodiment of the present invention. It is to be noted that in FIG. 4, portions similar to those of the embodiment shown in FIG. 1 have their reference numerals calculated by adding a number 100 to the corresponding reference numerals indicated in FIG. 1, and their detailed descriptions will be omitted. As shown in FIG. 4, the image display apparatus may further include combination pattern determination means 112 for displaying a plurality of combination patterns on the screen based on a concept that a user prefers. The combination pattern determination means 112 automatically selects a component that can be combined with the image displayed by image display control means 106 from among the plurality of components retrieved by combinable component search means 108. Then the combination pattern determination means 112 displays the plurality of combination patterns on the screen. The concept that a user prefers may be selected by the user as he/she wishes from among a plurality of predetermined concepts. Examples of the predetermined concepts to be prepared may be various, such as "what is capable of increasing protrusion", "what is capable of moving quickly", "what is capable of flying", "what has many weapons", "what is beautiful", and "what looks like strong". The combination patterns determined by the combination pattern determination means 112 may be selectably displayed with respect to the image of a core product, or may be displayed as an image of a combined state, separately from the image of the core product. How to display such combination pattern is arbitrary. With such combination pattern determination means 112, a plurality of images of a combination of components in which the user's concept has been reflected can be automatically displayed. As a result, a reference sample is shown to users who can hardly imagine how to combine the components.

Images actually created and images that can be used in the application may be stored in a separately-prepared memory means, or may be stored in a memory means located in application execution means 107.

Figure 5:
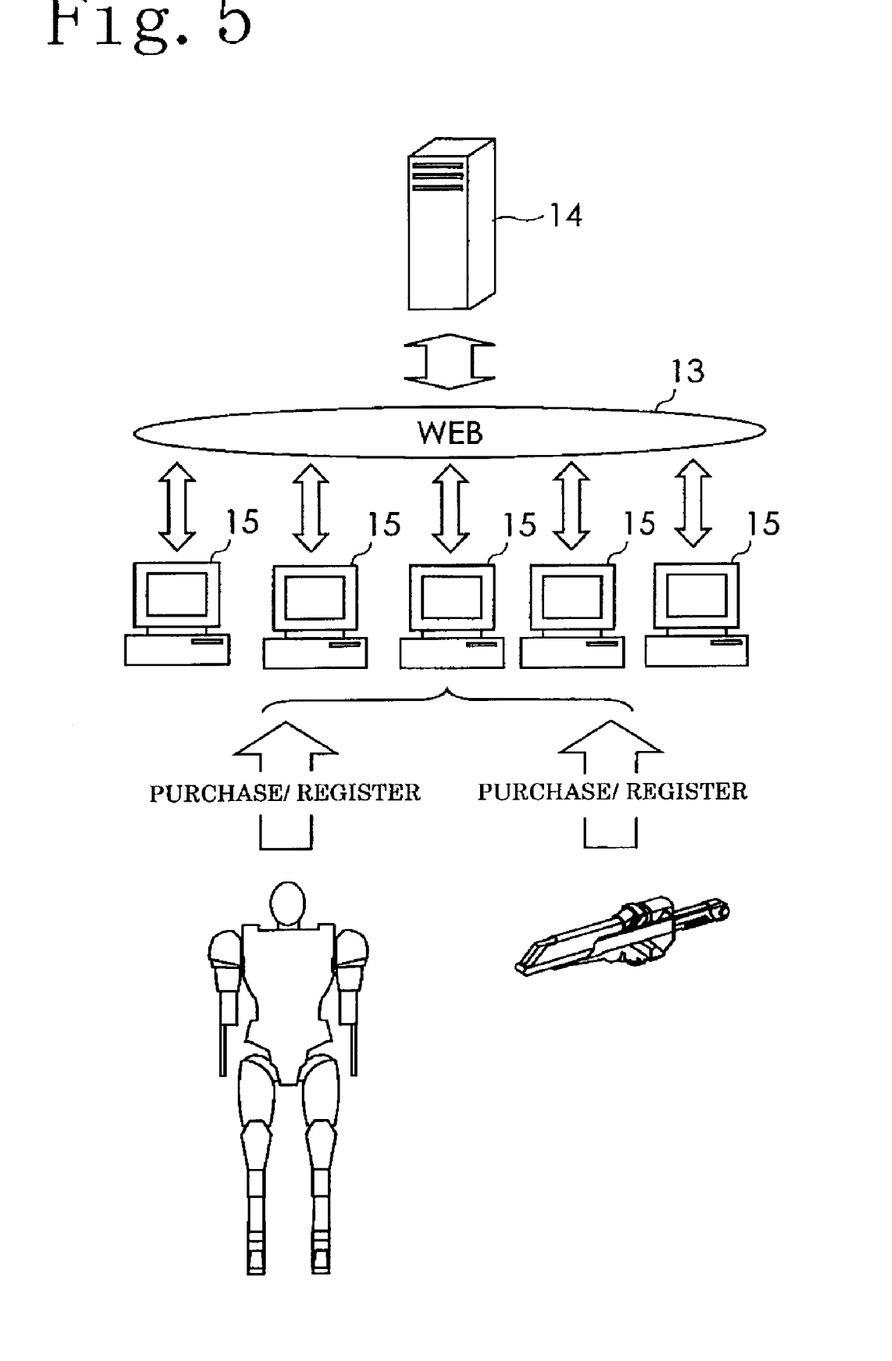
FIG. 5 is a view showing an outline of how to realize the image display apparatus of the present invention using a network.
Figure 6:
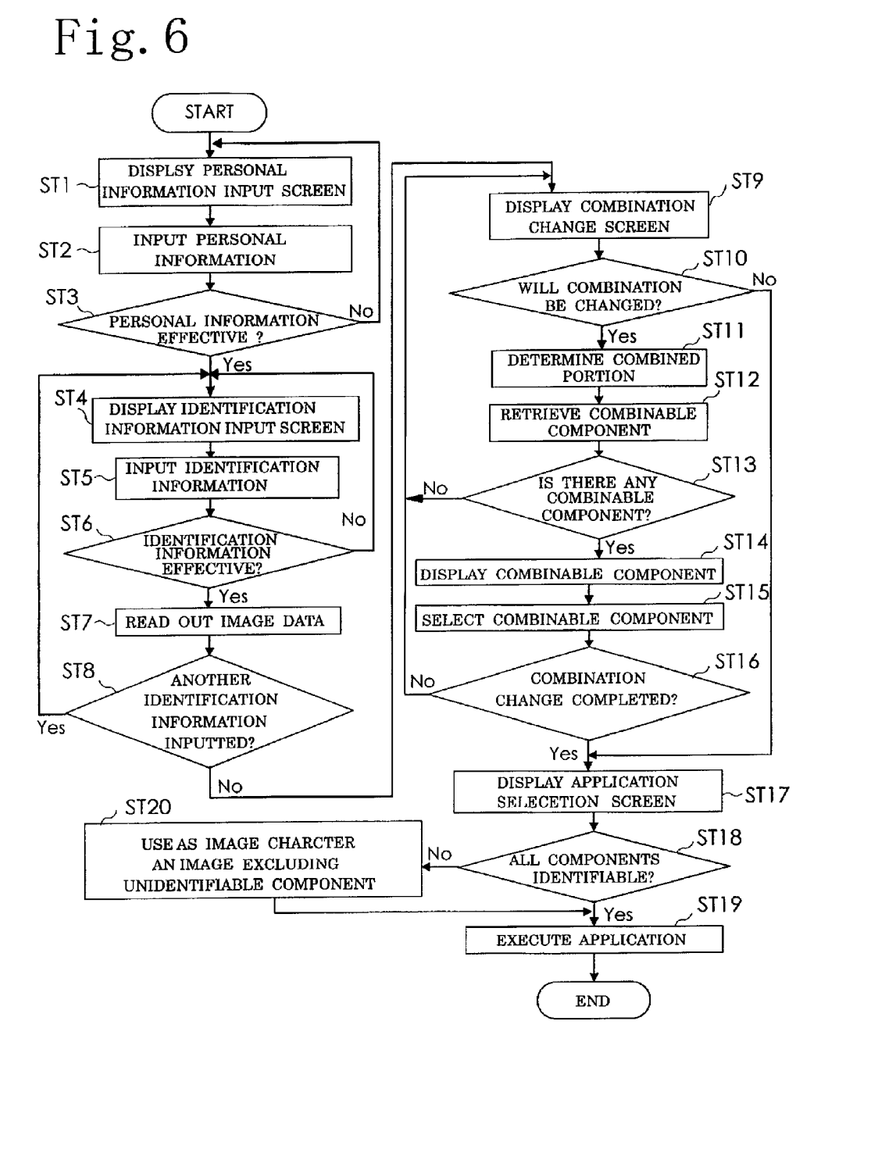
FIG. 6 is a flowchart showing an algorithm of a program used for realizing the image display apparatus of the present invention using the network.
Figure 7A:
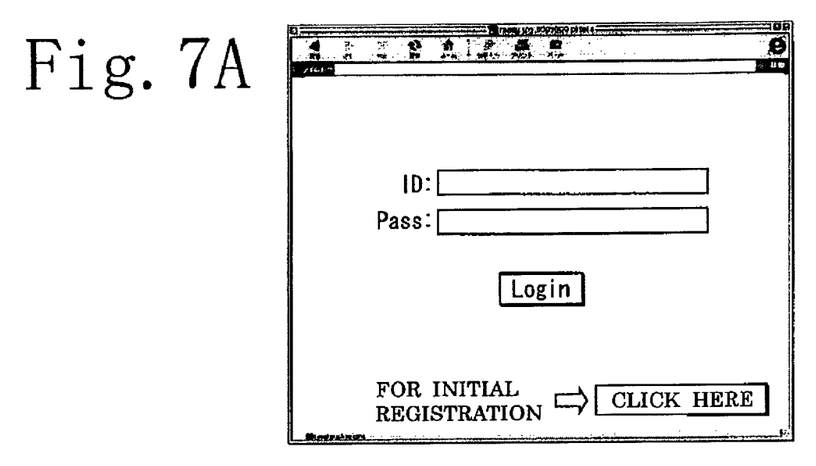
FIGS. 7A and 7B are views showing an example of input screens respectively.
Figure 7B:
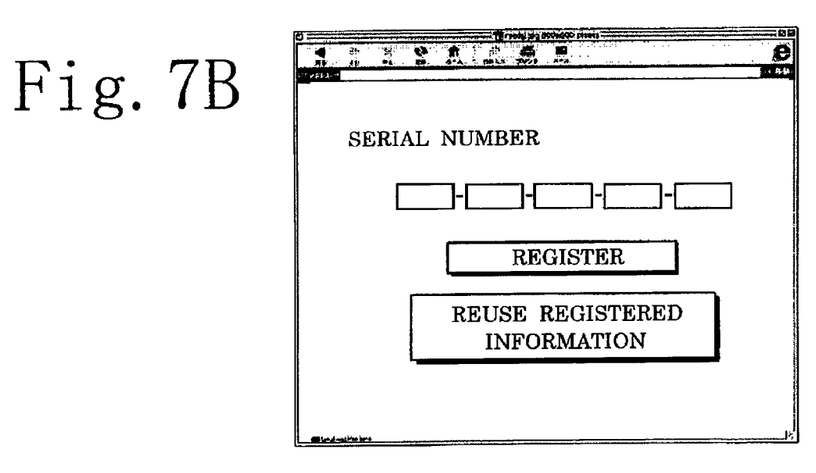

Next, the image display apparatus of the above-mentioned other embodiment, which is realized using a network, is schematically explained. FIG. 5 is a view conceptually showing how to implement the image display apparatus of the present embodiment using a network. Though the apparatus and program of the present invention is realizable only with one personal computer, it is also realizable by using a server 14 which is connected to a network 13, as shown in FIG. 5. In this case, an individual personal computer 15 includes at least input means 101, display apparatus 102, the image display control means 106 and a part of the application execution means 107. The server 14 includes identification information determination means 104, product image data storage means 105, the combinable component search means 108 and the combination pattern determination means 112. FIG. 6 is a flowchart showing an algorithm of a program used for implementing the image display apparatus using this network. FIGS. 7A and 7B are views showing an example of input screens or input means, respectively. When the individual personal computer 15 starts up, an input screen is displayed on the screen as shown in FIG. 7A (step ST1). Next, in step ST2, personal information (individual ID and password) is inputted for login. Initially, it is necessary to register the individual ID and password. In step ST3, it is determined whether or not the inputted personal information is effective. If it is determined that the personal information is effective in step ST3, the process proceeds to a next identification information input screen of FIG. 7B (step ST4). If it is determined that the personal information is ineffective, it returns to the input screen of step ST1.

On the identification information input screen, the identification information (here, a serial number) attached to a product is entered (step ST5), and a register button is clicked. In step ST6, it is determined whether or not the entered identification information is identical with the identification information of the product which is stored in the server 14. If it is determined that the identification information is identical with each other in step ST6, it proceeds to step ST7. Here, an image data corresponding to the identification information is read out from the product image data storage means 105, and the display control means 106 displays an image of the product on the screen based on the image data. In step ST8, it is determined whether or not there is another input of identification information. If there is not, it proceeds to step ST9 and a combination change screen is displayed. Incidentally, if it is determined that the inputted identification information is not effective in step ST6, or there is another input of the identification information in step ST8, the process returns to step ST4 in which the identification information input screen is displayed.

In step ST10, a certain input operation is carried out on the combination change screen displayed in step ST9 so that it can be determined whether or not any combination will be changed (addition or deletion of images of components). When it is determined to change any combination, where to change the combination is determined from among combined portions in step ST11. Then, in step ST12, the combinable component search means 108 retrieves components that are combinable with the determined combined portion in addition to the image of the product identified with the identification information. If the combinable component search means 108 has found a combinable component in step ST13, the image of the combinable component is displayed on a screen in step ST14.

Figure 8:
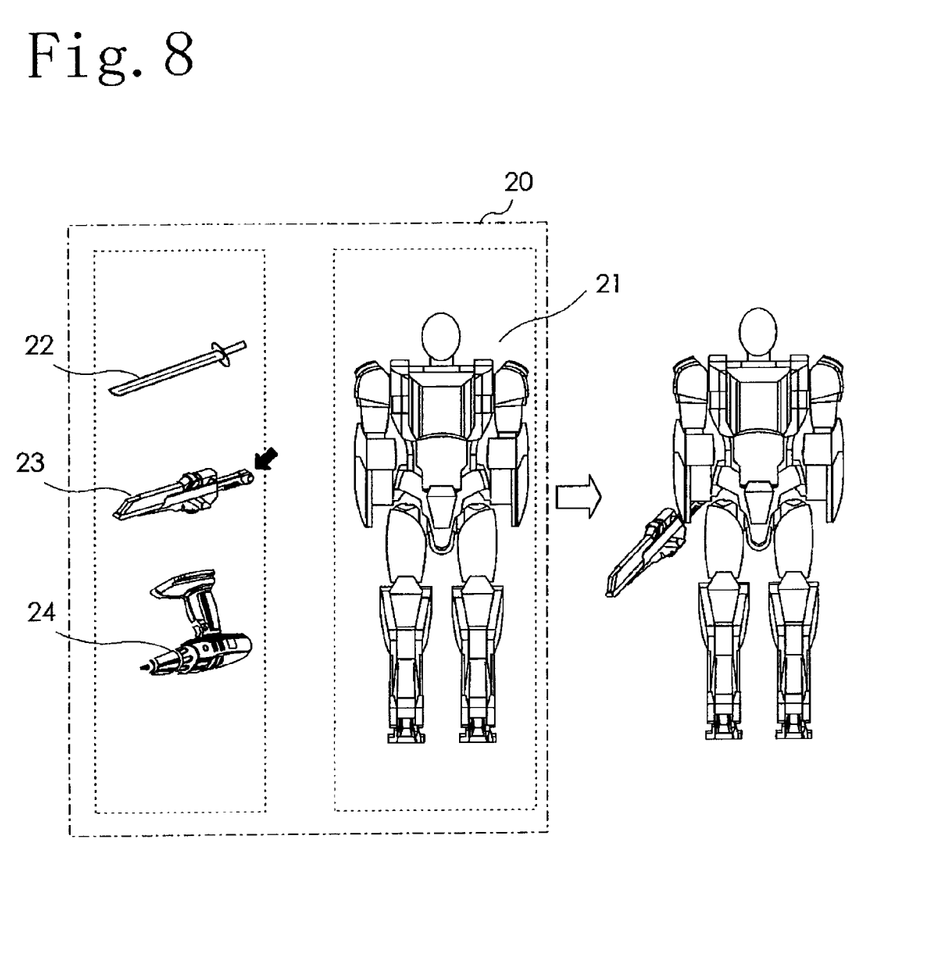
FIG. 8 is a view used in order to explain the combination of images.

FIG. 8 show a combination change screen 20 on which an image of the product 21 displayed by inputting an identification number and images of combinable components 22 to 24 retrieved by the combinable component search means 108 are displayed. In FIG. 8, an arrow represents a cursor. Determination of the combined portion and selection of the combinable component are carried out by pointing and clicking the cursor (step ST15). In FIG. 8, if the right hand of the product is selected as the combined portion by pointing and clicking the right hand with the cursor, combinable components (weapons) 22 to 24 that are combinable with the selected combined portion are displayed. Then, among the components 22 to 24, if the component 23 is pointed and clicked with the cursor, an image of the figure product, which has been combined with the clicked component, is displayed on the combination change screen 20 as shown on the right-side of FIG. 8. Other combination of components may be available if another combined portion is further selected as with the above. When it is detected in step ST16 that the combination operation is completed, a selection of application is executed in step ST17. When it is determined in step ST10 that no combination is changed (no component is added or deleted), the process skips directly to step ST17 and the selection of application is executed. Another step of registering the original image into the server 14 or the personal computer 15 may be inserted previous to this step.

When it is determined that there is no combinable component in step ST13, or combination changing operation is not completed yet in step ST16, the process is appropriately returned to a step ST9 in which the combination change screen is displayed, or a step ST11 in which the combined portion to be changed is selected.

It is premised in the present embodiment that the application is a game program. When an application is selected, the application execution means 107 becomes operative, and it is determined in step ST18 whether or not images of the components that constitute the created image are all identified with the identification information registered in advance. If the created image includes any image of a component that cannot be identified with the registered identification information, the created image excludes the image of the component that cannot be identified in step ST20. Of course, the image of the component that cannot be identified may be indicated with an imaginary line instead of being excluded. Then the application is executed in step ST19 using the created character as the image character that can be used for the application.

In the above-mentioned algorithm, no combination pattern is displayed based on a concept that a user prefers. To realize the display of combination pattern, what is necessary is to provide a routine to show users various kinds of changeable combination patterns, with a virtual button provided on the combination change screen displayed in step ST9 for executing the display of combination pattern.

To make it possible to reuse registered identification information upon creating an image again, a "registered information reuse" button may be provided on the identification information input screen as shown in FIG. 7B so that an image corresponding to the already registered identification information and an image created and registered in the past can be selected. In this case, users can see registered images by clicking the "registered information reuse" button so that they can select one to change a component combination from among the registered images. Here, what is necessary is to provide another routine to proceed a process to step ST9 if one image has been selected.

The algorithm of FIG. 6 can also be executed only within an individual personal computer without using a server connected to the network. In this case, what is necessary for a user is to download a program for executing the algorithm in advance and also all the data stored in the product image data storage means simultaneously. When a new product comes out, data and image relating to the new product can be updated separately.

One or more available application programs may be set available with a program of the algorithm of FIG. 6 in advance. However, of course, it is also possible to prepare an application, in which the image created using the image display apparatus of the present invention can be used as the image character so that it can be installed in computer independently. The program of the present invention may be stored in a computer-readable storage medium.

INDUSTRIAL APPLICABILITY

The present invention enables a user to virtually experience a combination of components that constitute a product even without actually purchasing it. However, an originally-created image character cannot be used in an application unless the user actually purchases a real product and inputs its identification information. That gives users information on products and increases user's buying intention.

The invention claimed is:

1. An image display apparatus comprising:
   identification information determination means for determining identification information acquired from a product, the product being constituted from a combination of a plurality of changeable components and having the identification information;
   product image data storage means for storing image data relating to images of the product having the identification information, the image data including image data relating to images corresponding to the plurality of components that constitute the product;
   image display control means for reading the image data of the image corresponding to the product from the product image data storage means, based on the identification information determined by the identification information determination means, and controlling displaying of the image of the product statically or dynamically on a screen of the image display apparatus;
   application execution means for executing an application using the image of the product as an image character; and
   combinable component search means for retrieving image data of one or more components that constitute another product identified by another identification information and that are to be combined with the plurality of components that constitute the product corresponding to the identification information determined by the identification information determination means;

the image display control means having a function of selectively displaying a search result obtained by the combinable component search means on the screen, and a function of displaying an arbitrary combination of one or more optionally selected images from among the images of the one or more components that have been retrieved by the combinable component search means and displayed on the screen, with the image of the product, the application execution means being configured to execute the application using the image displayed on the screen by the image display control means as the image character, only when the plurality of components that constitute the image displayed on the screen by the image display control means can be all identified with the identification information determined by the identification information determination means.

2. The image display apparatus according to claim 1, wherein the application execution means is configured to execute the application, when the plurality of components that constitute the image displayed on the screen by the image display control means include an image of a component that cannot be identified with the identification information determined by the identification information determination means, by using, as the image character, the image displayed on the screen by the image display control means excluding the image of the component that cannot be identified.

3. The image display apparatus according to claim 1, wherein the application execution means is configured to execute the application, when the plurality of components that constitute the image displayed on the screen by the image display control means include an image of a component that cannot be identified with the identification information determined by the identification information determination means, by using, as an image character, an image displayed by the image display control means on the screen wherein the image of the component that cannot be identified is indicated as a virtual component.

4. The image display apparatus according to claim 1, wherein
the plurality of changeable components are to be combined only when a predetermined combination condition is satisfied, and
the predetermined combination condition is added to the image data of the plurality of components corresponding to the plurality of components of which the image data are stored in the product image data storage means.

5. The image display apparatus according to claim 1, further comprising combination pattern determination means for determining a plurality of combination patterns by automatically selecting a component that is to be combined with the image displayed by the image display control means from among the plurality of components retrieved by the combinable component search means, based on a concept that a user prefers.

6. A computer-readable recording medium that stores a program for image display, which is installed in a computer, being configured to implement in the computer:

identification information determination means for determining identification information acquired from a product, the product being constituted from a combination of a plurality of changeable components and having the identification information;

product image data storage means for storing image data relating to images of the product having the identification information, the image data including image data relating to images corresponding to the plurality of components that constitute the product;

image display control means for reading the image data of the image corresponding to the product from the product image data storage means, based on the identification information determined by the identification information determination means, and controlling displaying of the image of the product statically or dynamically on a screen of the image display apparatus;

application execution means for executing an application using the image of the product as an image character; and combinable component search means for retrieving image data of one or more components that constitute another product identified with another identification information and that are to be combined with the plurality of components that constitute the product corresponding to the identification information determined by the identification information determination means;

the image display control means having a function of selectively displaying a search result obtained by the combinable component search means on the screen and a function of displaying an arbitrary combination of one or more optionally selected images from among the images of the one or more components that have been retrieved by the combinable component search means and displayed on the screen, with the image of the product, the application execution means being configured to execute the application using the image displayed on the screen by the image display control means as the image character, only when the plurality of components that constitute the image displayed on the screen by the image display control means are all identified with the identification information determined by the identification information determined means.

7. The image display apparatus according to claim 2, wherein
the plurality of changeable components are to be combined only when a predetermined combination condition is satisfied, and
the predetermined combination condition is added to the image data of the plurality of components corresponding to the plurality of components of which the image data are stored in the product image data storage means.

8. The image display apparatus according to claim 3, wherein
the plurality of changeable components are to be combined only when a predetermined combination condition is satisfied, and
the predetermined combination condition is added to the image data of the plurality of components corresponding to the plurality of components of which the image data are stored in the product image data storage means.

9. The computer-readable recording medium that stores the program for image display according to claim 6, wherein the application execution means is configured to execute the application, when the plurality of components that constitute the image displayed on the screen by the image display control means include an image of a component that cannot be identified with the identification information determined by the identification information determination means, by using, as an image character, the image displayed on the screen by the image display control means excluding the image of the component that cannot be identified.

10. The computer-readable recording medium that stores the program for image display according to claim 9, wherein
the plurality of changeable components are to be combined only when a predetermined combination condition is satisfied, and
the predetermined combination condition is added to the image data of the plurality of components corresponding to the plurality of components of which the image data are stored in the product image data storage means.

11. The computer-readable recording medium that stores the program for image display according to claim 6, wherein the application execution means is configured to execute the application, when the plurality of components that constitute the image displayed on the screen by the image display control means include an image of a component that cannot be identified with the identification information determined by the identification information determination means, by using, as an image character, an image displayed by the image display control means on the screen wherein the image of the component that cannot be identified is indicated as a virtual component.

12. The computer-readable recording medium that stores a program for image display according to claim 11, wherein
the plurality of changeable components are to be combined only when the predetermined combination condition is satisfied, and
the predetermined combination condition is added to the image data of the plurality of components corresponding to the plurality of components of which the image data are stored in the product image data storage means.

13. A computer-readable recording medium that stores a program for image display for an image display apparatus, the image display apparatus comprising:
identification information determination means for determining identification information acquired from a product, the product being constituted from a combination of a plurality of changeable components and having the identification information;
product image data storage means for storing image data relating to images of the product having the identification information, the image data including image data relating to images corresponding to the plurality of components that constitute the product;
image display control means for reading the image data of the image corresponding to the product from the product image data storage means, based on the identification information determined by the identification information determination means, and controlling displaying of the image of the product statically or dynamically on a screen of the image display apparatus;
application execution means for executing an application using the image of the product as an image character; and
combinable component search means for retrieving image data of one or more components that constitute another product identified by another identification information and that are to be combined with the plurality of components that constitute the product corresponding to the identification information determined by the identification information determination means;
the image display control means having a function of selectively displaying a search result obtained by the combinable component search means on the screen, and a function of displaying an arbitrary combination of one or more optionally selected images from among the images of the one or more components that have been retrieved by the combinable component search means and displayed on the screen, with the image of the product,
the application execution means being configured to execute the application using the image displayed on the screen by the image display control means as the image character, only when the plurality of components that constitute the image displayed on the screen by the image display control means can be all identified with the identification information determined by the identification information determination means,
being configured to further implement:
combination pattern determination means for determining a plurality of combination patterns by selecting a component that is to be combined with the image displayed by the image display control means from among the plurality of components retrieved by the combinable component search means, based on a concept that a user prefers.

* * * * *

UNITED STATES PATENT AND TRADEMARK OFFICE
CERTIFICATE OF CORRECTION

| | | |
|---|---|---|
| PATENT NO. | : 7,766,221 B2 | Page 1 of 1 |
| APPLICATION NO. | : 12/373326 | |
| DATED | : August 3, 2010 | |
| INVENTOR(S) | : Kasahara | |

It is certified that error appears in the above-identified patent and that said Letters Patent is hereby corrected as shown below:

On the Face Page, in the Figure, for Tag "ST1", in Line 1, delete "DISPLSY" and insert -- DISPLAY --, therefor.

On the Face Page, in the Figure, for Tag "ST20", in Line 1, delete "CHARCTER" and insert -- CHARACTER --, therefor.

On the Face Page, in the Figure, for Tag "ST17", in Line 2, delete "SELECETION" and insert -- SELECTION --, therefor.

In Fig. 4, Sheet 4 of 8, for Tag "107", in Line 1, delete "EXECUTINO" and insert -- EXECUTION --, therefor.

In Fig. 6, Sheet 6 of 8, for Tag "ST1", in Line 1, delete "DISPLSY" and insert -- DISPLAY --, therefor.

In Fig. 6, Sheet 6 of 8, for Tag "ST20", in Line 1, delete "CHARCTER" and insert -- CHARACTER --, therefor.

In Fig. 6, Sheet 6 of 8, for Tag "ST17", in Line 2, delete "SELECETION" and insert -- SELECTION --, therefor.

Signed and Sealed this
Fourth Day of January, 2011

David J. Kappos
*Director of the United States Patent and Trademark Office*